US008883013B2

(12) United States Patent
Perot

(10) Patent No.: US 8,883,013 B2
(45) Date of Patent: Nov. 11, 2014

(54) FACILITY FOR TREATING AN AQUEOUS FLUID BY CONTACT WITH A FLUIDISED BED OF COAGULATED ACTIVATED CARBON IN POWDER FORM

(75) Inventor: Jean Perot, Elancourt (FR)

(73) Assignee: Saur, Guyancourt (FR)

( * ) Notice: Subject to any disclaimer, the term of this patent is extended or adjusted under 35 U.S.C. 154(b) by 94 days.

(21) Appl. No.: 13/377,010

(22) PCT Filed: Jun. 9, 2010

(86) PCT No.: PCT/EP2010/058116
§ 371 (c)(1),
(2), (4) Date: Dec. 8, 2011

(87) PCT Pub. No.: WO2010/142746
PCT Pub. Date: Dec. 16, 2010

(65) Prior Publication Data
US 2012/0080385 A1    Apr. 5, 2012

(30) Foreign Application Priority Data
Jun. 9, 2009 (FR) ...................................... 09 53811

(51) Int. Cl.
*C02F 1/52* (2006.01)
*C02F 1/24* (2006.01)
*B03D 3/02* (2006.01)
*C02F 1/56* (2006.01)
*C02F 1/28* (2006.01)
*C02F 3/08* (2006.01)

(52) U.S. Cl.
CPC . *C02F 1/283* (2013.01); *C02F 1/56* (2013.01); *C02F 1/5236* (2013.01); *C02F 3/085* (2013.01)
USPC ........... 210/723; 210/101; 210/104; 210/290; 210/705

(58) Field of Classification Search
CPC ......... C02F 1/283; C02F 3/085; C02F 1/5236
USPC ........................... 210/101, 104, 290, 705, 723
See application file for complete search history.

(56) References Cited

U.S. PATENT DOCUMENTS

| 3,767,570 | A | * | 10/1973 | Clapp | 210/618 |
| 4,008,161 | A | * | 2/1977 | Wong et al. | 210/666 |
| 4,065,391 | A | * | 12/1977 | Farabaugh | 210/274 |
| 4,159,244 | A | * | 6/1979 | Amagi et al. | 210/807 |
| 4,274,968 | A | * | 6/1981 | Grutsch et al. | 210/666 |
| 4,659,462 | A | | 4/1987 | Chapman | |
| 5,932,099 | A | | 8/1999 | Cote et al. | |
| 6,048,459 | A | * | 4/2000 | Khudenko | 210/617 |
| 7,172,701 | B2 | * | 2/2007 | Gaid et al. | 210/616 |
| 7,678,278 | B2 | * | 3/2010 | Binot et al. | 210/661 |
| 2003/0209476 | A1 | * | 11/2003 | Josse et al. | 210/151 |
| 2007/0059224 | A1 | * | 3/2007 | Clack | 422/186.01 |

FOREIGN PATENT DOCUMENTS

| DE | 195 07 239 A1 | 3/1996 |
| FR | 2 252 301 A1 | 6/1975 |
| FR | 2 301 481 | 9/1976 |
| FR | 2 628 337 A1 | 9/1989 |
| GB | 1 519 692 | 8/1978 |
| WO | WO 99/19257 A2 | 4/1999 |
| WO | WO 02/10077 A1 | 2/2002 |

OTHER PUBLICATIONS

International Search Report issued in application No. PCT/EP2010/058116 on Nov. 3, 2010.

* cited by examiner

*Primary Examiner* — Nam Nguyen
*Assistant Examiner* — Claire Norris
(74) *Attorney, Agent, or Firm* — Foley & Lardner LLP

(57) ABSTRACT

The present invention relates to a treatment installation of aqueous fluid, in particular to ensure elimination of organic micropollutants and natural organic matter, comprising a single reactor (10) for treatment of aqueous fluid by contact with a fluidized bed of coagulated and flocculated powdered activated carbon, operating in ascending flow, said reactor being equipped with injection means of new powdered activated carbon, coagulant and polymer, arranged to define three distinct operating zones in the reactor:
  a first arranged zone (A) at the base of the reactor to ensure intake and homogeneous distribution of the aqueous fluid pre-treated by contact with coagulant and polymer,
  a second zone, surmounting the first, constituted by the fluidized bed of coagulated and flocculated powdered activated carbon (B), and
  a third zone (C), arranged in the top part of the reactor for separation and recovery of the purified aqueous liquid.

22 Claims, 1 Drawing Sheet

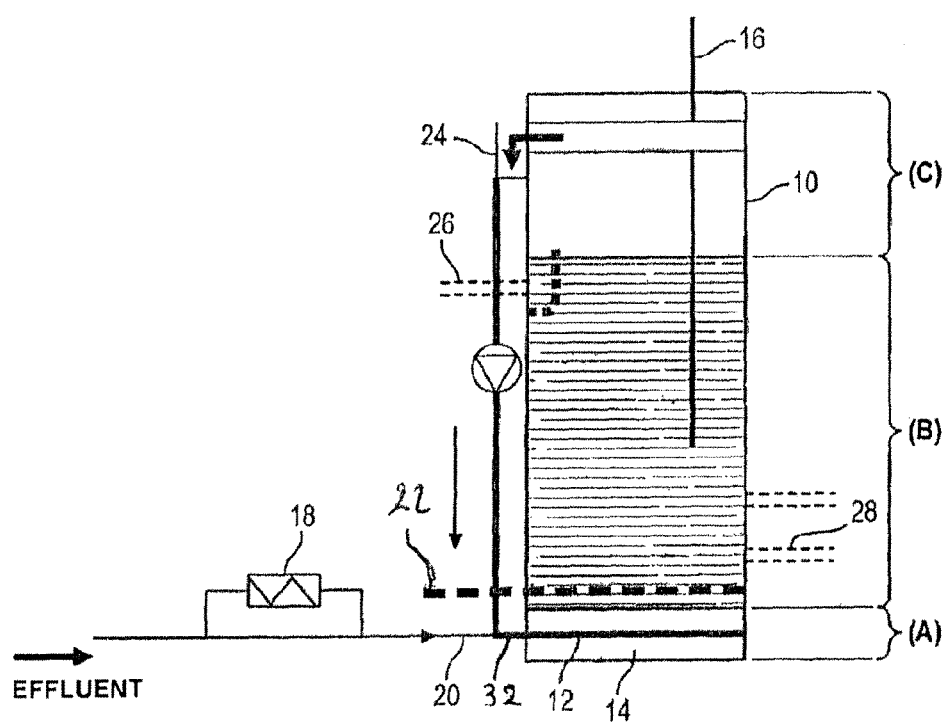
EFFLUENT

FACILITY FOR TREATING AN AQUEOUS FLUID BY CONTACT WITH A FLUIDISED BED OF COAGULATED ACTIVATED CARBON IN POWDER FORM

The present invention relates to a treatment installation for aqueous fluid, especially in the field of drinking water and wastewater, in particular to ensure the elimination of organic micropollutants and natural organic matter, comprising a single treatment reactor for aqueous fluid by contact with a fluidised bed of coagulated and flocculated powdered activated carbon, operating in ascending flow.

Application of the activated carbon to depollution of drinking water or to treatment of industrial water is widely developed from filtration on activated grain carbon (ACG). The search for novel systems based on activated carbon more effective for elimination of organic micropollutants and organic matter has lead to treatment processes based on powdered activated carbon (PAC).

Within the scope of the use of powdered activated carbon in specific implementing technologies known from the prior art, two methods of use can be cited for example either in the form of powdered activated carbon injected directly into the water flow upstream of a preferably membrane filtration system, or in the form of a powdered activated carbon bed in a specific reactor, with or without addition of coagulant and flocculant as per known technologies. In the second case, unitary contact/separation operations of sludge of the treated water are carried out either in separate coagulation/flocculation/decantation structures, or in a single tank with sludge bed or sludge recirculation decanters and immersed membranes reactors.

Further, in the second case, coagulants and/or flocculants must be added except in the case of immersed membranes where such addition is not useful.

The applicant has already designed and developed a refining system based on sludge bed of coagulated powdered activated carbon marketed under the name Carboflu®. The applicant wanted to develop this concept of coagulated powdered activated carbon bed utilising even more compact novel implementing technology with substantial investment and operational gains.

Therefore, the invention relates to the treatment of aqueous fluids, for example water for which the aim is to eliminate organic micropollutants and natural organic matter.

The invention applies more precisely to the treatment of water to make it drinkablesuch as surface water and underground water by using powdered activated carbon in fluidised form in a single contact reactor after addition of coagulation and flocculation reagents. For surface water, this type of reactor will preferably be placed downstream of a clarification installation. For underground water, the reactor could be placed to directly treat raw water.

Irrespective of the origin of water to be make drinkable, treatment specific to activated carbon will be followed by filtration of treated water on granular media (rapid filtration) or by way of a membrane system (frontal or tangential filtration).

Application to the field of wastewater can also be contemplated especially for tertiary treatment of Urban Wastewater (UW) in the framework of eliminating emergent organic micropollutants especially. Here, treatment may or may not be followed by a filtration step according to the researched use (discharge into the natural environment, reuse).

The invention relates more particularly to the use of powdered activated carbon in a specific treatment structure operating in ascending flow inside which hydraulic mixing is ensured by means of a dispersion ramp for water to be treated placed on the bottom of the structure.

According to the present invention, in particular for all fields of application where the aim is to eliminate organic compounds by adsorption, the reactor of the invention is equipped with injection means for new powdered activated carbon, coagulant and polymer, arranged to coordinate with the water supply circuit so as to define three distinct operating zones in the reactor:

a first arranged zone at the base of the reactor to ensure intake and homogeneous distribution of the aqueous fluid pre-treated by contact with the coagulant and the polymer, a second zone, surmounting the first, constituted by the fluidised bed of coagulated and flocculated powdered activated carbon, and a third zone, arranged in the top part of the reactor for separation and recovery of the purified aqueous liquid.

According to another characteristic of the invention, the injection means (intake circuit) of new powdered activated carbon are associated with an extraction circuit for waste powdered activated carbon of the fluidised bed, placed in the lower part of the second zone of the reactor.

According to another characteristic of the invention, the reactor comprises a fluidised bed of coagulated and flocculated powdered activated carbon, at concentrations which can reach several grams per liter, advantageously between 1 and 10 g/l, and in particular adjustable according to the nature of the carbon used, its granulometric characteristics and the fluidisation rate imposed in the contact structure.

According to another characteristic of the invention, hydraulic mixing is ensured inside the fluidised bed by means of at least one dispersion ramp of aqueous fluid to be treated, arranged in the first zone at the base of the reactor.

According to another characteristic of the invention, hydraulic mixing is ensured by a system constituted by a distributor in the form of a plurality of dispersion ramps pierced with orifices arranged equidistantly and pointing towards the bottom of the reactor and constituting the hydraulic distribution network.

According to another characteristic of the invention, the entire distribution system for aqueous liquid is embedded in a lining constituted by a gravel bed resting on the bottom of the reactor and covering the hydraulic distribution network topped by a bed of sand.

According to another characteristic of the invention, the reactor comprises in its third arranged zone in the top part a draw off channel for channelling the purified aqueous liquid.

According to another characteristic, the installation according to the invention comprises coagulant injection means inside the fluidised bed, as well as coagulant injection means in the aqueous liquid supply circuit, upstream of the first intake arranged zone in the lower part of the reactor.

According to another characteristic, the coagulant injection means inside the fluidised bed terminate at a fluidised bed height extending between its lower part and its median part preferably to favour trapping and agglomeration of particles of new carbon injected in the form of hydroxide flocs.

Therefore, the use of coagulant is indispensable for keeping the carbon in the reactor in zone (B) by trapping particles of carbon in the form of flocs, ready for decanting.

According to an advantageous characteristic of the invention, the coagulant injection means in the supply circuit are fitted with a mechanical and/or static mixing system.

According to another characteristic of the invention, the installation comprises polymer injection means online on the supply circuit for previously coagulated aqueous liquid, and/ or by means of a specific polymer injection ramp placed inside the fluidised bed, immediately above the first arranged zone in the lower part of the reactor.

According to an advantageous characteristic of the invention, the installation comprises a recirculation circuit for treated water terminating upstream of the intake ramp to ensure a maintenance function of the fluidised bed during the halts of production on the reactor.

According to the present invention, the installation particularly advantageously comprises an air introduction circuit (32) connected to the water-dispersion ramp (12), ensuring loosening of the activated carbon bed in case of prolonged stoppage of the reactor without water recirculation.

According to another characteristic of the invention, the reactor is equipped with a device for collecting sludge arranged in the third high zone of the reactor to ensure racking of coagulated PAC sludge if needed, for example if the height of the bed increases beyond a limited value fixed by the user or for other needs of the field of operation of the process.

According to another characteristic of the invention, the reactor has a cylindrical form with a circular or polygonal cross-section whereof the dimensions are selected to ensure an ascending speed of aqueous liquid between 6 and 10 $m^3/m^2 \cdot h$.

According to an advantageous characteristic of the invention, the reactor has a useful height between 3.9 m and 6 m.

According to another characteristic of the invention, the powdered activated carbon has an apparent density between 0.30 and 0.60 kg/l.

According to another characteristic of the invention, the powdered activated carbon has a granulometry representative of particle sizes of less than 100 µm, advantageously between 1 and 45 µm, typically between 3 and 35 µm.

Within the scope of the present invention, the use of powdered activated carbon (PAC) with a particle size of less than 100 µm contributes to purification gains which are increased relative to former technologies using activated grain carbon with larger particles sizes. In fact, the PAC allows increasing adsorption capacities and reducing consumption in adsorbent in relation to the size of particles.

The present application also relates to the use of an installation such as defined previously for making drinkable surface water, involving prior clarification of water to be treated or for making drinkable underground water by direct treatment of raw water.

According to another characteristic of the invention, treatment by contact of the fluidised bed in the reactor is followed by filtration of treated water, on granular media or on a membrane system.

According to another characteristic of the invention, new powdered activated carbon is injected in a dose appropriate to ensure the continuous renewing of the fluidised carbon bed, which is from at least 3 to 5 mg/l to eliminate organic micropollutants.

According to another characteristic of the invention, new powdered activated carbon is injected in a dose appropriate to ensure the continuous renewing of the fluidised carbon bed, which is from at least 5 to 10 mg/l to eliminate natural organic matter.

The technology used produces a bed of coagulated and flocculated activated carbon which can reach several grams per liter over several meters in height.

Advantageously, the average concentration of the fluidised bed of powdered activated carbon in the reactor (zone B) is between 1 and 10 g/l, typically between 3 and 7 g/l.

Advantageously, the fluidisation height will be between 1.5 and 4 m in the reactor (zone B), typically between 2 and 3 m.

The passage of raw water through the bed of powdered activated carbon ensures depollution treatment of organic micropollutants and natural organic matter according to different possible modes as a function of the nature of the pollutant (adsorption on the particles of carbon and trapping on the metal hydroxides). No mechanical mixing is necessary, mixing with water of the sludge bed created by the hydraulics of the dispersion ramp prevents compaction at the bottom of the structure and any preferential passage of water. The purified water is channelled from draw off channels placed in the top part of the structure.

Obtaining a fluidised sludge bed is possible only due to placing precise devices for coagulant, new powdered activated carbon and polymer injection in the installation the general block diagram of which is illustrated in the single attached FIGURE showing the different corresponding precise introduction zones.

To ensure proper distribution of water arriving at the bottom of the reactor 10, the installation comprises a distributor 12 on which are placed sets of equidistant ramifications pierced with holes on each of them at identical intervals and preferably directed towards the bottom staggered alternately. The entirety of such a distributor is embedded in a lining 14, advantageously constituted by a gravel bed resting on the bottom of the reactor 10 and on which rests a bed of sand. Such an assembly constitutes a first arranged zone (A) ensuring homogeneous distribution of the supply water at the base of the reactor 10.

According to the present invention, injection of coagulant is done at two different levels, i.e. by:
  1/ simultaneous dosages of coagulant and new powdered activated carbon inside an intake ramp 16 terminating in the sludge bed (B) and preferably in the lower median part on the height of this fluidised bed; and
  2/ dosage of coagulant upstream of the intake ramp 12 of raw water or effluent.

This mode of operation allows adjusting perfectly well the part of coagulant to be used vis-à-vis the coagulation of particles of carbon introduced in the reactor and the part associated with overall control of the behaviour of the fluidised bed of activated carbon over time and to requirements for water to be treated on the structure. The injection circuit of coagulant upstream of the intake ramp 12 could be provided with a mechanical or static mixing system 18 for accelerating dispersion of the reagent before it enters the raw-water intake ramp 12.

As illustrated in the attached diagram, the present invention therefore provides injection of coagulant at two levels with the dosage of reagent on the supply circuit of water to be treated and the preparation/dosage of powdered activated carbon.

For executing the present invention, all coagulants based on iron and aluminium can be retained, for example ferric chloride and ferric sulfate for iron, aluminium sulfate and the commercial products WAC, WAC HE and Aqualenc for aluminium.

The person skilled in the art will know how to determine the treatment rate of coagulant as a function of the dosage of PAC. The addition of doses of coagulant employed at the 2 abovementioned levels can reach a Fe/PAC mass ratio between 54 and 140 mg Fe $g^{-1}$ PAC for reagents based on iron and an Al/PAC mass ratio between 17 and 44 mg Al $g^{-1}$ PAC for aluminium-based reagents.

Advantageously: the total dose of coagulant reagent is distributed over the two circuits in a range between 20 and 80%.

By way of example of distribution of coagulant doses, the following conditions can be mentioned:

Dosage of powdered activated carbon: 5 g m$^{-3}$
Coagulant used: Ferric chloride in the form of liquid at 40-41% by weight of pure $FeCl_3$
Optimal mass ratio Fe/PAC: 140 mg Fe g$^{-1}$ PAC
Distribution of coagulant and rate of treatment:

|  | Rate of coagulant treatment | | Mass ratio Fe/PAC (mgFe g$^{-1}$ PAC) | Distribution (%) |
| --- | --- | --- | --- | --- |
|  | (g Fe m$^{-3}$) | (g FeCl$_3$m$^{-3}$) |  |  |
| On the raw water circuit | 0.233 | 0.68 | 46.7 | 33.3 |
| On the new PAC dosage station | 0.467 | 1.36 | 93.3 | 66.7 |

According to the present invention, injection of polymer online on the previously coagulated raw water circuit 20 and/or via a specific ramp 22 placed inside the carbon bed above the arranged zone (A) should be provided in the installation previously described.

Also, the use of polymer is essential in the process if the aim is to maintain a compact fluidised bed of activated carbon of several grams per liter with a separation zone between the treated water and the carbon bed, well identified. The arranged zone (A) permits optimal dispersion of the polymer flocculation reagent at the base of the bed (B) of sludge following the path 22. Dispersion via an intake ramp in the reactor remains a possible alternative 20.

Within the framework of the present invention, the use of flocculation additives is indispensable in the constitution of the fluidised bed of activated carbon in producing dense flocs of particles of carbon complexed by bridging flocs of coagulated and flocculated carbon resulting from the action of the coagulant. Acrylic flocculants such as anionic and non-ionic polyacrylamides will preferably be retained. The choice of dose is to be adapted according to the nature of the water and the characteristics of the activated carbon employed. The rate of treatment can be in a range from 0.1 to 0.5 mg·L$^{-1}$.

Within the framework of the production of water intended for human consumption, treatment in this reactor 10 must be followed by a filtration step.

The entire industrial filtration processes on granular media and membrane processes are likely to be placed downstream of the activated carbon treatment. Examples are sand filtration or filtration on ultrafiltration membrane. The choice of systems and operating regulations are subject to the nature of the water to be treated on the fluidised carbon bed reactor.

To incorporate the process for treatment of surface water requiring a clarification and filtration step due to the nature of the resource, the reactor 10 will be positioned between clarification and filtration treatments. The term clarification here means the fundamental steps of coagulation, flocculation and decantation (or flotation) which the raw water must undergo prior to moving on to a filtration step. Within the framework of use of an ozone oxidation step, the treatment will advantageously be placed upstream of the refining activated carbon treatment as is found in procedures of conventional industrial treatment upstream of refining treatment based on activated carbon. With this conventional configuration of treatment procedure, there will be different alternatives in the future of waste powdered activated carbon extracted from the coagulated powdered activated carbon reactor with:

recycling of the powdered activated carbon at the level of clarification upstream of flocculation preceding decantation; of no interest if the separation step comprises flotation;

incorporation of sludge of waste powdered activated carbon on the sludge procedure originating from clarification or treatment on a sludge procedure specific to refining treatment.

For treatment of underground water for which only organic micropollutants are to be eliminated, the direct treatment process of raw water will be put in place. Carbon refining will be followed by a filtration step. For water requiring corrective measures to eliminate suspended matter (SM), turbidity and metals such as iron and manganese for example, refining treatment for direct treatment of raw water will be put in place if elimination of these compounds is provided on a unit filtration in base solution, and in the event where clarification is proposed, refining treatment is placed downstream of the latter; filtration is put in place in post-treatment in all cases.

In its third arranged zone in the top part (C) the reactor 10 finally comprises a draw off channel 24 for channelling purified water.

The aim of placing a recirculation circuit for treated water 24 by a set of pumps (not shown) terminating upstream of the intake ramp 12 is to maintain a fluidised sludge bed (B) during the halts of production on the structure. The aims are the following:

maintaining a fluidised bed (B) during the halts of production to avoid compaction of sludge of powdered activated carbon during those periods which will be more difficult to expand rapidly with restart of the effluent feed;

maintaining aerobic conditions inside the sludge bed by passing water saturated with dissolved oxygen to prevent the formation of nitrites and ammonium associated with problems of biological fermentation occurring in anaerobiosis.

The production device could be put into service advantageously in particular cases when the feed rate proves insufficient for creating a sufficiently expanded bed. This mode of operation can be necessary when the installation is dimensioned over extended ranges of feed rates.

According to the present invention, the reactor is equipped particularly advantageously with an air-loosening circuit (32) directly connected to the raw-water intake ramp (12). Its function is loosening of the PAC bed when the reactor has remained isolated over long periods without recirculation of treated water prior to being returned to service.

The reactor can be equipped with a structure for collecting sludge 26 in the upper part of the structure if the aim is to secure the system in the event of excessive rises of the sludge bed linked to degradation of the water to be treated with the presence of suspended matter trapped in the sludge bed, the consequence being an increase in the volume of the bed. Here, the excess sludge terminates in a trench for racking outside the structure.

Carbon renewal of the coagulated PAC bed is obtained by meansof an intake circuit 16 of new carbon, inside the fluidised bed in zone (B), and of an extraction circuit 28 of powdered waste activated carbon from the fluidised bed placed preferably in the lower to median part of the structure above the arranged zone (A).

The extraction of the waste powdered activated carbon of the sludge bed can be carried out by pumping using a metering pump or by gravity racking by means of extraction piping inside the carbon bed following 30 or by means of a sludge concentrator or the flocs of powdered activated carbon are collected from an overflow at 26, where the two PAC extraction systems can be combined.

In this latter case, the structure for collecting sludge 26 secures the system in the event of excessive rises of the sludge bed linked to degradation of the water to be treated with the presence of suspended matter trapped in the sludge bed. The height of the sludge bed can be kept at the level of the racking zone towards a sludge trench.

According to the present invention, the requirements of dimensions of the structures are subject to the need to fluidise the material inside the contact/separation reactor and in search of a contact time in the bed of powdered activated carbon not limiting vis-à-vis researched purifying functions. Structures of preferably cylindrical cross-section can be variously of circular or square cross-section.

The dimensions of the structure must advantageously consider the following parameters:
- ascending speeds of between 2 to 12 $m^3/m^2 \cdot h$ and preferably between 6 and 10 $m^3/m^2 \cdot h$;
- contact times in the carbon bed adequate with the nature of the organic micropollutant or micropollutants to be eliminated and the characteristics of the retained carbon in powder form (nature, origin and granulometry); the contact time is assimilated to the empty bed hydraulic dwell time corresponding to the volume occupied by the adsorbent material in the form of a fluidised bed.

The choice of hydraulic speeds takes into account the origin of the carbon concerning the characteristics of density and granulometry with products having apparent densities of between 0.30 and 0.6 kg/L and sizes covering the field of powdered activated carbons with granulometries ranging from a few microns: 3-5 μm to several tens of microns (15 to 45 μm or 80 to 99 μm for example). Contact times are within a wide range of possible values according to the applications and purifying needs as for any conventional adsorbent-based system. Guide values of between 10 and 30 minutes for example can be postulated in refining treatment for surface water which has previously undergone clarification treatment if the aim is to eliminate organic micropollutants with for example pesticides or natural organic matter refractory to initial pre-treatment. Within the framework of specific applications in the industrial field or in the wastewater field, contact times could be prolonged beyond 30 to 60 minutes to respond to very strong organic loads to be eliminated and/or adapted to high levels of pollution of organic micropollutants. Dosages of new carbon ensuring continuous renewal of the fluidised carbon bed will be selected according to the nature of the pollution and the aims of depollution. We could for example work on dosage ranges of between 3 and 5 mg/l in eliminating organic micropollutants and 5 to 10 mg/l in eliminating natural organic matter. The doses will be further increased within the scope of specific treatment and could reach several tens or hundreds of milligrams per liter according to polluting loads and the nature of organic molecules to be eliminated.

By way of simple illustration is given below a particular example of hydraulic dimensioning of the treatment installation according to the invention intended for "drinking water" application or "refining of surface water after clarification". The particular conditions mentioned hereinbelow have led to results which are totally satisfactory in practice.

Nominal rate: 200 $m^3/h$
Daily production: 4000 $m^3/j$
Number of structure: 1
Ascending speed: 8 $m^3/m^2 \cdot h$
Contact time: 20 min
Cross-section: square
Volume of fluidised carbon bed: close to 66.7 $m^3$
Wrking concentration in coagulated and flocculated activated carbon: close to 5 $g \cdot L^{-1}$
Characteristics of the structure:
Length: 5 m
Width: 5 m
Useful height of the structure: 4.8 m
  Details: Height of the arranged zone: 0.6 m
    Fluidisation height of the bed of activated carbon at nominal rate: close to 2.7 m
    (Value indicative of the water temperature of 6° C.)
    Safety height: 1.5 m (Distance from the top of the bed to the restitution level of treated water).

The invention claimed is:

1. A treatment installation for aqueous fluid comprising a single reactor (10) for treatment of aqueous fluid by contact with a fluidised bed of coagulated and flocculated powdered activated carbon, operating in ascending flow, said reactor being equipped with injection means of new powdered activated carbon, coagulant and polymer, said injection means being arranged so as to define in the reactor three distinct operating zones:
   a first zone (A) arranged at the base of the reactor containing a lining of gravel and sand, wherein said first zone is substantially free of powdered activated carbon, to ensure intake and homogeneous distribution of the aqueous fluid pre-treated by contact with the coagulant and the polymer,
   a second zone, surmounting the first, constituted by the fluidised bed of coagulated and flocculated powdered activated carbon (B), and
   a third zone (C) surmounting the second zone and extending up to the top of the reactor which allows separation and recovery of the purified aqueous liquid fluid,
   wherein said installation comprises:
     an aqueous supply circuit (20) connected to at least one dispersion ramp (12) disposed in said first zone;
     an intake ramp (16) opening in said second zone, said intake ramp being connected to coagulant and new powdered activated carbon injection means;
     a coagulant injection circuit connected to said aqueous supply circuit (20);
     polymer injection means connected to said aqueous supply circuit (20), downstream of said coagulant injection circuit, and/or a polymer injection ramp (22) opening in said second zone;
     a draw off channel (24) disposed in said third zone for channeling purified aqueous fluid;
     a waste powdered activated carbon extraction circuit (28) disposed in the lower part of said second zone.

2. The treatment installation as claimed in claim 1, wherein the concentration of powdered activated carbon in said fluidized bed can reach 1 to 10 grams per liter.

3. The treatment installation as claimed in claim 1, wherein said aqueous supply circuit (20) is connected to a plurality of dispersion ramps pierced with orifices placed equidistant and directed towards the bottom of the reactor.

4. The treatment installation as claimed in claim 1, wherein the coagulant injection circuit is provided with a mechanical and/or static mixing system (18).

5. The treatment installation as claimed in claim 1, wherein it comprises a recirculation circuit of the treated fluid terminating upstream of the intake ramp to ensure a maintenance function of the fluidised bed during the halts of production on the reactor.

6. The treatment installation as claimed in claim 1, wherein it comprises an air introduction circuit (32) connected to said dispersion ramp.

7. The treatment installation as claimed in claim 1, wherein the reactor is equipped with a device for collecting sludge arranged below the third zone (C) of the reactor to ensure racking of coagulated PAC sludge.

8. The treatment installation as claimed in claim 1, wherein the reactor has a cylindrical form with a circular or polygonal cross-section whereof the dimensions are selected to ensure an ascending speed of the aqueous liquid between 6 and 10 $m^3/m^2 \cdot h$.

9. The treatment installation as claimed in claim 1, wherein the reactor has a useful height between 3.9 m and 6 m.

10. The treatment installation as claimed in claim 1, wherein the powdered activated carbon has an apparent density between 0.30 and 0.60 kg/l.

11. The treatment installation as claimed in claim 1, wherein the powdered activated carbon has a representative granulometry of sizes of particles of less than 100 μm.

12. A method for making drinkable surface water, comprising treating water with an installation as claimed in claim 1, and further comprising previous clarification of said water to be treated.

13. A method for making drinkable underground water, comprising directly treating raw water with an installation as claimed in claim 1.

14. A method as claimed in claim 12, comprising treatment of water by contact with the fluidised bed in the reactor followed by filtration of treated water on granular media or on a membrane system.

15. A method as claimed in claim 12, wherein new powdered activated carbon is injected at a dose suitable for ensuring continuous renewal of the fluidised bed, which is from at least 3 to 5 mg/l for eliminating organic micropollutants.

16. A method as claimed in claim 12, wherein new powdered activated carbon is injected at a dose suitable for ensuring continuous renewal of the fluidised bed, which is from at least 5 to 10 mg/l for eliminating natural organic matter.

17. A method as claimed in claim 13, comprising treatment of water by contact with the fluidised bed in the reactor followed by filtration of treated water on granular media or on a membrane system.

18. A method as claimed in claim 13, wherein new powdered activated carbon is injected at a dose suitable for ensuring continuous renewal of the fluidised bed, which is from at least 3 to 5 mg/l for eliminating organic micropollutants.

19. A method as claimed in claim 13, wherein new powdered activated carbon is injected at a dose suitable for ensuring continuous renewal of the fluidised bed, which is from at least 5 to 10 mg/l for eliminating natural organic matter.

20. A method as claimed in claim 1, wherein the coagulated and flocculated powdered activated carbon in the fluidised bed is at concentrations between 1 and 10 g/l.

21. An installation as claimed in claim 11, wherein the powdered activated carbon has a representative granulometry of sizes of particles of between 1 and 45 μm.

22. A method as claimed in claim 1, wherein the intake ramp (16) opens between a lower part and a median part of said second zone.

\* \* \* \* \*